United States Patent Office 2,988,852
Patented June 20, 1961

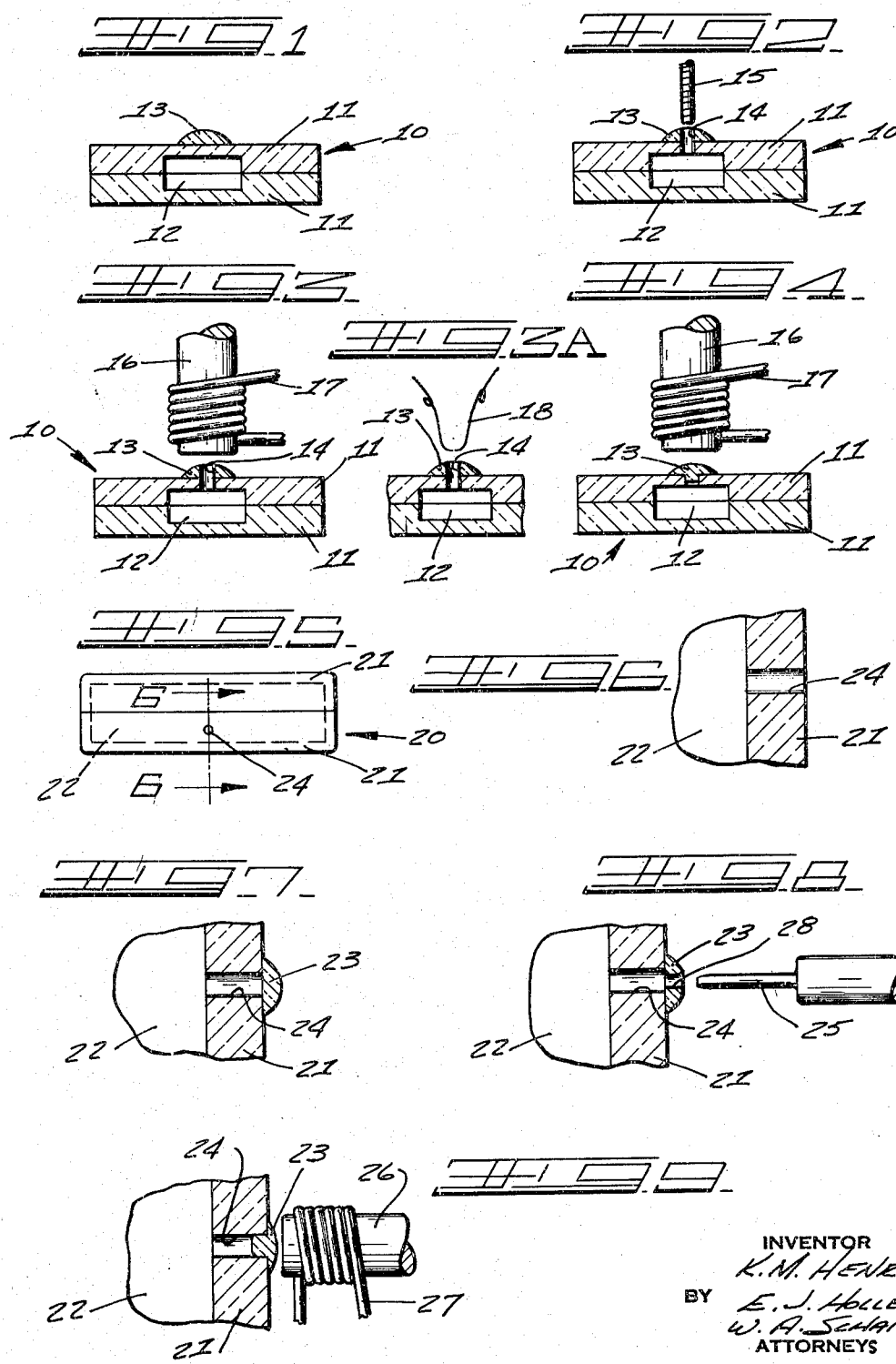

---

2,988,852
METHOD OF THERMALLY SEALING HOLLOW GLASS ARTICLES AT MINIMAL TEMPERATURES
Kenneth M. Henry, Toledo, Ohio, assignor to Owens-Illinois Glass Company, a corporation of Ohio
Filed Dec. 11, 1957, Ser. No. 702,176
1 Claim. (Cl. 49—78)

The present invention relates to sealing hollow articles and more specifically to an improved method of hermetically sealing hollow glass structures by heating a localized application of sealant to a minimized temperature.

This invention also relates to providing access into the interior of a hollow glass article through its sidewall and sealing the same thereat in vacuum-tight relationship with the avoidance of adverse effects within or upon the glass article. The invention further provides both entry into the interior of the article through a localized opening and a sealing medium therearound applicable to thermal sealing at relatively low temperatures.

In the manufacture of certain types of electrical devices, such as electronic tubes having at least a part of their envelopes comprised of glass parts, it is frequently necessary that entry be facilitated into the interior of the device after the major components of the envelope are united. It is common for these electronic devices to have extremely critical dimensions, or heat-sensitive internal elements, or both, which prevent their being exposed to or heated above limiting temperatures at which any distortion, deformation and/or stresses are created in the glass parts. One example of such article is a vibration damper which functions to control electrical circuitry in a prescribed manner. The envelopes generally referred to in this invention may be fabricated of either solely glass or other ceramic materials, or glass and metal parts.

The primary problem in sealing both large and small glass envelopes or assemblies whether they consist of electronic tubes, twin pane glazing, or glass block units, for example, has been one of avoiding elevated temperatures in creating the hermetic seal to minimize objectionable changes in the glass parts. It is imperative that an opening once provided be capable of sealing or resealing into hermetic condition after the interior of the article is vented, evacuated, or a particularly thermally sensitive material or element is disposed therein. An example of the latter disposition is one where an extremely low vapor pressure material is introduced into the glass envelope. The seal must be permanently vacuum-tight in final form to prevent leakage and to maintain a hermetic barrier. Obviously, when the sealed hollow cavity loses its vacuum tight character, an evacuated article may be slowly let down to atmospheric pressure during its operation causing its malfunction or complete failure.

In the manufacture of glass blocks or twin-paned glazing, it is frequently necessary to provide a vent hole in the assembly to facilitate the withdrawal of air therefrom. Dry air or inert gas is introduced into the article during final stages of fabrication of the assembly. This is frequently necessary to prevent undesirable condensation of moisture sealed within the assembly and to improve its thermal characteristics.

Accordingly, it is an object of the present invention to provide an improved sealing method for an integral opening in a glass sidewall of a hollow article, the sealing being effected thermally at reduced temperatures.

Another object of this invention is to provide an improved method of sealing a hollow glass article with a low-melting glass sealing material applicable to bonding with a parent high-melting glass of the article, which material may be penetrated to provide access into the article interior and heat-softened at minimized temperatures for its closure.

Another object of the present invention is to furnish a unique method of providing both access into and a hermetic seal for the interior of a hollow glass envelope in the sidewall portion thereof, the seal being capable of formation by minimized external heating.

A still further object of the present invention is to provide a novel method of both opening and sealing a hollow article by passage through a glass sidewall thereof and externally applying a portion of sealant, the latter capable of being heated to its softening or melting temperature at minimal temperatures without adverse effects in the parent glass to subsequently accomplish the sealing function.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

FIG. 1 is a vertical sectional view of a glass article fabricated from several component parts, its interior to be opened and sealed.

FIG. 2 is a view similar to FIG. 1, showing an opening formed in the article sidewall through a locally applied sealing medium.

FIG. 3 is a view similar to FIG. 1, of a heating element brought into proximity with the sealing medium for its heat softening.

FIG. 3a is a view similar to FIG. 3 illustrating a modification of the heating element.

FIG. 4 is a view similar to FIG. 3 showing the article in finally sealed condition.

FIG. 5 is a side elevational view of a hollow glass article such as a glass block unit.

FIG. 6 is a fragmentary vertical sectional view taken along the line 6—6 of FIG. 5 showing a preformed opening.

FIG. 7 is a view similar to FIG. 6 showing a localized application of sealant applied over the opening.

FIG. 8 is a view similar to FIG. 7 showing the sealant and a penetrating device therefor.

FIG. 9 is a view similar to FIG. 8 showing a heating element and the opening in finally sealed form.

This invention is characterized by the utilization of a sealing medium comprised of a low-melting glass sealing composition having chemical and physical properties applicable to bonding to the parent glass. The composition is one which may be heat-softened at temperatures below both the annealing and deformation point temperatures of the parent glass to which it is applied. The composition is initially applied externally of the glass sidewall and when thermally softened to permit its coalescence inwardly into the sidewall opening which it surrounds. The opening is thereby closed and hermetically sealed into a permanent vacuum-tight closure.

The invention is not limited to the specific configuration of the opening which may assume any desired shape or contour and may be formed before or after the application of sealing medium. The sealing medium is one which may be quickly softened or melted by a contiguous heating element, placed either in close proximity or in actual physical contact therewith for its softening and flow into the opening in the parent glass.

In the working embodiment of the present invention illustrated in FIG. 1, the hollow article 10 is fabricated of glass or other vitreous or ceramic material either entirely as shown or partially in an area to be opened.

The article 10 as shown is formed of two glass parts 11 which form and enclose a hollow cavity 12. A portion of glass sealing composition 13 is externally applied to at least one of the sidewalls of component part 11 in a selected area where the sidewall of the article is to be penetrated.

As shown in FIG. 2, an opening 14 is made into the interior of the article 10 through a central region of the glass sealing composition 13 by a suitable drill bit 15. The drill is selected as one which will penetrate the parent glass of the article 10 as well as the sealing composition 13 and may be employed without creating elevated temperatures in the article.

Following formation of opening 14, the same may be utilized as a vent to replace moisture-containing air sealed within the article or for evacuation of its interior as desired. Also an inert gas may be introduced into the article or various coating materials applied over particular inner surfaces of the article as by vaporization in an independent operation. Naturally other operations may be performed within the accessible interior such as cleaning after the drilling operation.

Upon the completion of one or more desired operations, heating element 16 surrounded at its extremity by an electrical heating coil 17 is brought into close proximity with the opening 14 and in essentially axial alignment therewith. The heating element 16 is preferably fabricated of metal having a high coefficient of thermal conductivity such as copper, silver, or platinum. Element 16 is heated to sufficient temperatures to radiate a concentrated flow of heat toward sealing composition 13. This material will readily heat-soften and/or melt on its outer surfaces and tend to coalesce inwardly by surface tension into the region of the opening 14.

Heating of sealing composition 13 may also be effected by an electrical resistance wire 18 which is energized and brought up to an extremely high temperature. The wire 18 may be placed either in near relationship with the sealing composition 13 or in direct physical contact therewith to soften the same and draw a small portion of the surrounding material into the opening 14.

As shown in FIG. 4, the sealing composition 13 at least partially fills the preformed opening 14 in the parent glass and forms an extremely adherent bond therewith at the contacted surfaces. In the localized heating operation only the glass sealing composition 13 is heated to melting to seal the article. By proper direction of the heat emitted by its source, neither the article interior nor its exposed surfaces near the heat source are elevated in temperature beyond a reasonably moderate level.

The sealing composition 13 preferably consists of a vitreous material such as a lead borate containing solder glass having a melting or softening point at a temperature below that at which permanent stresses are induced into the base glass on sealing, thus permitting rapid cooling. Such sealing compositions have been fully disclosed in the copending application of Francl and Hagedorn, entitled "Low Temperature Glass Sealing Composition," Serial No. 554,753, filed December 22, 1955, now abandoned and assigned to a common assignee.

The sealing composition has the added feature of being conducive to repeated sealing and unsealing without serious devitrification or physical degradation. The coefficient of thermal contraction of the sealing composition need not be precisely the same as the parent glass, but should be within agreeable limits so that virtually stress-free seals may be created. The composition is able to flow and wet the surfaces of the base glass at temperatures below its annealing point temperature. The melting temperature of the solder glass is preferably of the order of approximately 840° F. and its firm adherence to the more refractory base glass is readily accomplished at this temperature or slightly below. A sealing temperature of about 840° F. prevents the occurrence of objectionable stresses or deformation of the parent glass. Most common glasses generally require extensive annealing or reshaping when heated to 1000° F. or above.

One glass solder which has been successfully used is composed of 2.08% $SiO_2$; 15.4% $B_2O_3$; 1.88% CuO; 71.17% PbO; and 9.47% ZnO. Such sealing compositions may be used with various types of lead or lead-free parent glasses, as well as other glasses designed specifically for electronic tube envelopes or devices. Another example of the sealing composition is one composed of 72% PbO; 19% $B_2O_3$ and 9% ZnO and having a fiber softening point temperature of 801° F. and a coefficient of thermal expansion of $90.6 \times 10^{-7}$. Another example of the sealing composition is one composed of 70% PbO; 14% $B_2O_3$ and 16% ZnO+CuO and having a fiber softening point temperature of 735° F. and a coefficient of thermal expansion of $90.0 \times 10^{-7}$.

In a modification of the present invention illustrated in FIGS. 5-9, a glass block unit 20 comprised of two halves 21 of similar configuration is provided with a vent opening 24 extending into its interior 22. The opening 24 may have a regular cylindrical contour or an inwardly tapering configuration as desired. An external application of sealing composition 23 is applied over and around opening 24 to temporarily seal the hole externally. The application of composition 23 may be accomplished by locally heating the adjacent external surfaces of part 21 surrounding the opening 24 to a relatively low temperature and applying the sealing medium.

The applied hemispherical-shaped layer of composition 23 is penetrated centrally by a probe 25 fabricated of high-temperature alloy or metal. The probe 25 may be heated on its tapering extremity to penetrate the sealing composition 23 axially of article opening 24 as shown in FIG. 8. The aforesaid or other operative steps may then be conducted through the opening.

A similar heating element 26 surrounded by an electrical heating coil 27 may be brought into close proximity with composition 23 to locally and externally heat-soften the sealant to cause its flow at least partially into opening 24 to permanently seal the block unit. Greater or lesser amounts of sealing composition 23 as required may be applied externally of opening 24 to accomplish this form of sealing. In articles where durability and mild forms of shock must be endured, it may be desired to provide sufficient sealant externally of opening 24 to permit its near complete filling of the access port on heat softening.

In the illustrative embodiments, heating elements 16 and 26 may be surrounded by an induction heating coil 17 and 27 as desired to quickly heat the low-melting solder glass. The glass sealing composition is preferably one having a fiber softening point in the range of from 700 to 1000° F. and a coefficient of thermal expansion in approximate agreement with the base glass. The term "base" glass as used herein is employed to designate a higher melting glass of any of various known types which will not soften or deform at the temperatures used for sealing the article with the low-melting sealant.

Various modifications may be resorted to within the spirit and scope of the appended claim.

I claim:

The method of providing access into and resealing at minimal temperatures a hermetically sealed hollow glass article without adverse effects thereon comprising the steps of bonding a localized portion of low-melting glass sealing composition to a prescribed external surface of a sidewall of said glass article, said sealing composition having a softening point temperature in the range of from about 700° to 1000° F. considerably below the deformation point temperature of said glass article with their thermal expansivities in approximate agreement, providing an opening through and within the localized external portion of said sealing composition and the glass sidewall into the interior of said article, subsequently heat-softening said glass sealing composition by a localized application of heat to effect its coalescence inwardly into the opening in said article sidewall, and cooling the said sealing composition to reseal hermetically the said glass article.

References Cited in the file of this patent

UNITED STATES PATENTS

| | | |
|---|---|---|
| 2,031,660 | Loepsinger | Feb. 25, 1936 |
| 2,389,360 | Guyer et al. | Nov. 30, 1945 |
| 2,648,179 | Manes et al. | Aug. 11, 1953 |
| 2,649,993 | Burdick et al. | Aug. 25, 1953 |
| 2,688,824 | Badger et al. | Sept. 14, 1954 |
| 2,694,273 | Spyut | Nov. 16, 1954 |
| 2,736,143 | Ford | Feb. 28, 1956 |
| 2,775,028 | Wampler | Dec. 25, 1956 |
| 2,784,462 | Fix | Mar. 12, 1957 |
| 2,894,294 | Prescott | July 14, 1959 |